（12） United States Patent
Trenz

(10) Patent No.: US 9,163,741 B2
(45) Date of Patent: Oct. 20, 2015

(54) GAS REGULATING UNIT

(75) Inventor: Milos Trenz, Domasov (CZ)

(73) Assignee: Honeywell Technologies SARL, Rolle (CH)

( * ) Notice: Subject to any disclaimer, the term of this patent is extended or adjusted under 35 U.S.C. 154(b) by 326 days.

(21) Appl. No.: 12/996,905

(22) PCT Filed: May 22, 2009

(86) PCT No.: PCT/EP2009/003659
§ 371 (c)(1),
(2), (4) Date: Jan. 5, 2011

(87) PCT Pub. No.: WO2009/149822
PCT Pub. Date: Dec. 17, 2009

(65) Prior Publication Data
US 2011/0162729 A1    Jul. 7, 2011

(30) Foreign Application Priority Data

Jun. 11, 2008   (DE) .......................... 10 2008 027 796

(51) Int. Cl.
*F16K 27/02*    (2006.01)

(52) U.S. Cl.
CPC ... *F16K 27/0236* (2013.01); *F23K 2900/05001* (2013.01); *F23N 2035/18* (2013.01); *F23N 2035/20* (2013.01); *Y10T 137/7762* (2015.04)

(58) Field of Classification Search
CPC .................... F16K 27/0263; Y10T 137/7762; F23K 2900/05001; F23N 2035/20; F23N 2035/18
USPC ....................... 137/65, 495, 505.14
See application file for complete search history.

(56) References Cited

U.S. PATENT DOCUMENTS 2,649,767 A * 8/1953 Matthews ........................ 137/65
3,000,320 A * 9/1961 Ring ............................. 417/383

(Continued)

FOREIGN PATENT DOCUMENTS

DE    202008006804 U1 *   8/2008  .............. F16K 27/00
EP        1417432 A1    10/2007
GB        2413618       11/2005

OTHER PUBLICATIONS

English Machine Translation—DE 202008006804, Sep. 29, 2014, Europeon Patent Office, pp. 1-4 claims and 1-4 specification and p. 1 drawings, http://translationportal.epo.org/emtp/translate/?ACTION=description-retrival&COUNTR-attached.*

(Continued)

*Primary Examiner* — Kevin Murphy
*Assistant Examiner* — Daphne M Barry
(74) *Attorney, Agent, or Firm* — Seager, Tufte & Wickhem LLP

(57) ABSTRACT

The invention relates to a gas regulating unit with a valve basic body (11) which forms at least one gas inlet chamber and one gas outlet chamber, with a safety valve and with a main gas valve, wherein the safety valve and the main gas valve either open or close a gas flow from the gas inlet chamber into the gas outlet chamber. According to the invention, the valve basic body (11) comprises at least three parts, namely at least one plastic core (12), which defines the gas inlet chamber and the gas outlet chamber, and at least two metallic shells (13, 14), wherein a first metallic shell (13) encloses the plastic core (12) at least in sections on an upper side, and wherein a second metallic shell (14) encloses the plastic core (12) at least in sections on an underside, and wherein at least one diaphragm (15) is positioned between one of said metallic shells (14) and the plastic core (12), which at least one diaphragm (15) delimits in each case a drive chamber, in which a servopressure prevails, for the safety valve and/or the main gas valve.

16 Claims, 2 Drawing Sheets

(56) References Cited

U.S. PATENT DOCUMENTS

| | | | | |
|---|---|---|---|---|
| 3,355,945 | A | * | 12/1967 | Perry .............................. 73/201 |
| 3,407,838 | A | * | 10/1968 | Boteler ........................ 137/375 |
| 3,731,534 | A | * | 5/1973 | Painley et al. .................. 73/273 |
| 4,558,206 | A | * | 12/1985 | Ball .............................. 392/468 |
| 4,562,857 | A | * | 1/1986 | Ball .............................. 137/375 |
| 4,976,366 | A | * | 12/1990 | Russell ........................ 220/4.21 |
| 6,793,199 | B2 | * | 9/2004 | Bushik et al. ................. 251/367 |
| 2003/0030024 | A1 | | 2/2003 | Bushik et al. |
| 2003/0145891 | A1 | * | 8/2003 | Buescher et al. ............. 137/491 |
| 2004/0163704 | A1 | | 8/2004 | Huang |
| 2009/0092936 | A1 | | 4/2009 | Buezis et al. |

OTHER PUBLICATIONS

Notification of Transmittal of Translation of the International Preliminary Report on Patentability (Chapter I of Chapter II of the Patent Cooperation Treaty), International Application No. PCT/EP2009/003659, International Filing Date, May 22, 2009, mailed Jan. 20, 2011.

* cited by examiner

GAS REGULATING UNIT

The invention relates to a gas regulating unit according to the preamble to Claim 1.

Gas regulating units which are known from practice have a valve body, forming a gas inlet chamber and a gas outlet chamber, as well as a safety valve and a main gas valve. With the aid of the safety valve and the main gas valve, a gas flow from the gas inlet chamber into the gas outlet chamber is either allowed or shut off. The safety valve typically takes the form of a valve which is either open or closed. The main gas valve preferably takes the form of a modulating gas valve, with which the magnitude of the gas flow flowing from the gas inlet chamber into the gas outlet chamber can be adjusted.

In gas regulating valves which are known from practice, the valve basic body is made from metal, in particular from an aluminum alloy. Since the valve basic bodies have a complex contour or geometry, the manufacture of valve basic bodies from an aluminum alloy is laborious and expensive. There is therefore a need for gas regulating valves which can be made at lower cost.

The object of the invention is to provide an innovative gas regulating unit. This object is achieved by a gas regulating unit having the features of Claim 1.

According to the invention, the valve basic body comprises at least three parts, namely at least one plastic core, which defines the gas inlet chamber and the gas outlet chamber, and at least two metallic shells, wherein a first metallic shell encloses the plastic core, at least in sections, on a top side and wherein a second metallic shell encloses the plastic core, at least in sections, on a bottom side, and wherein between one of these metallic shells and the plastic core there is positioned at least one diaphragm, which for the safety valve and/or the main gas valve respectively delimits a drive chamber, in which a servo pressure prevails.

The valve basic body of the gas regulating unit according to the invention comprises at least three parts, namely at least one plastic core and at least two metallic shells, which enclose the or each plastic core, at least in sections, in the region of the top side and the bottom side. The plastic core here provides the gas inlet chamber and the gas outlet chamber, a plastic core of this type being able to be produced at lower cost than valve basic bodies which are made of an aluminum alloy and are known from the prior art. The metallic shells primarily assume the function of protecting the plastic core from mechanical loads which act on the latter from the outside.

Preferred refinements of the invention emerge from the subclaims and the following description.

An illustrative embodiment of the invention is explained in greater detail below, without restriction hereto, with reference to the drawing. In the drawing.

Figure 1:
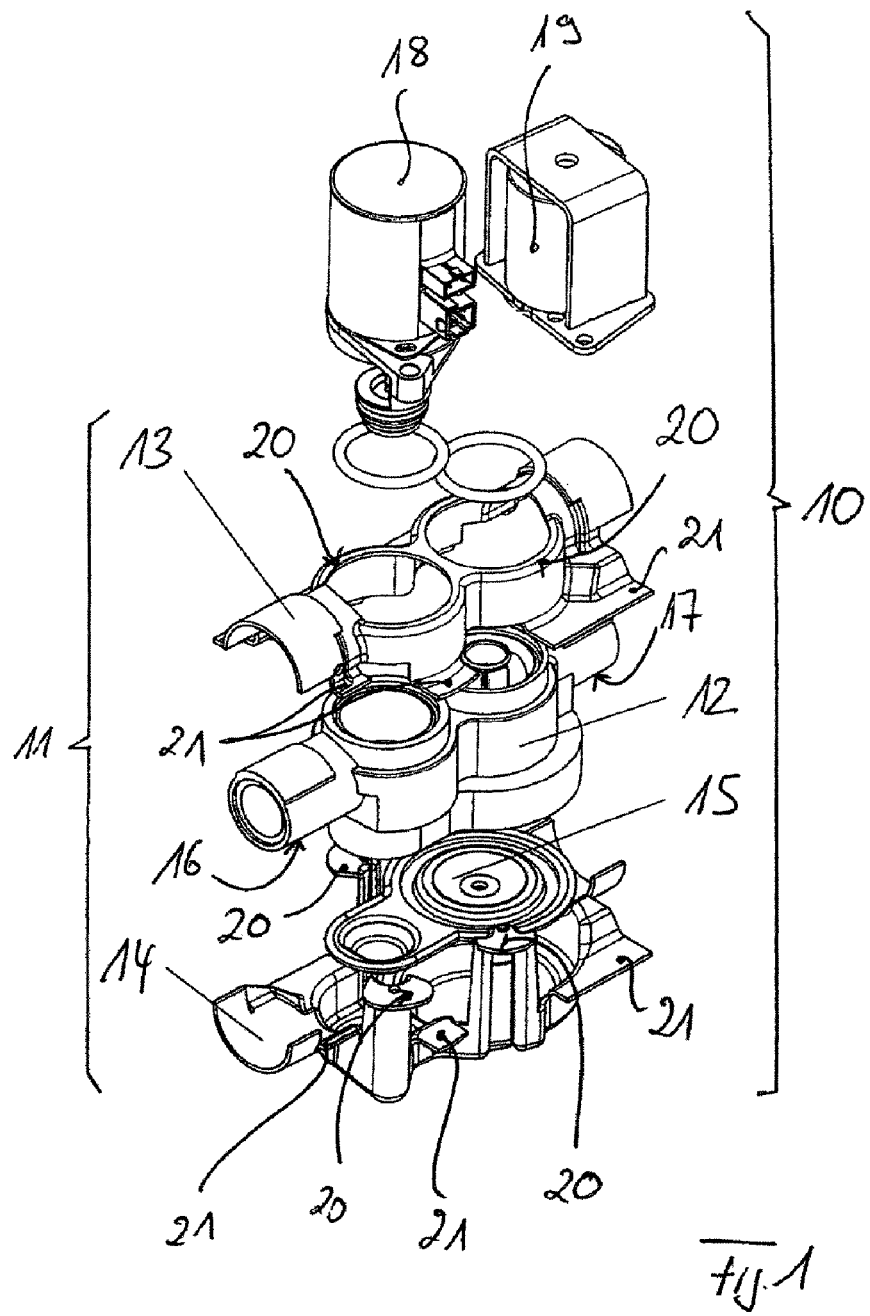
FIG. 1 shows an exploded representation of a gas regulating unit according to the invention.
Figure 2:
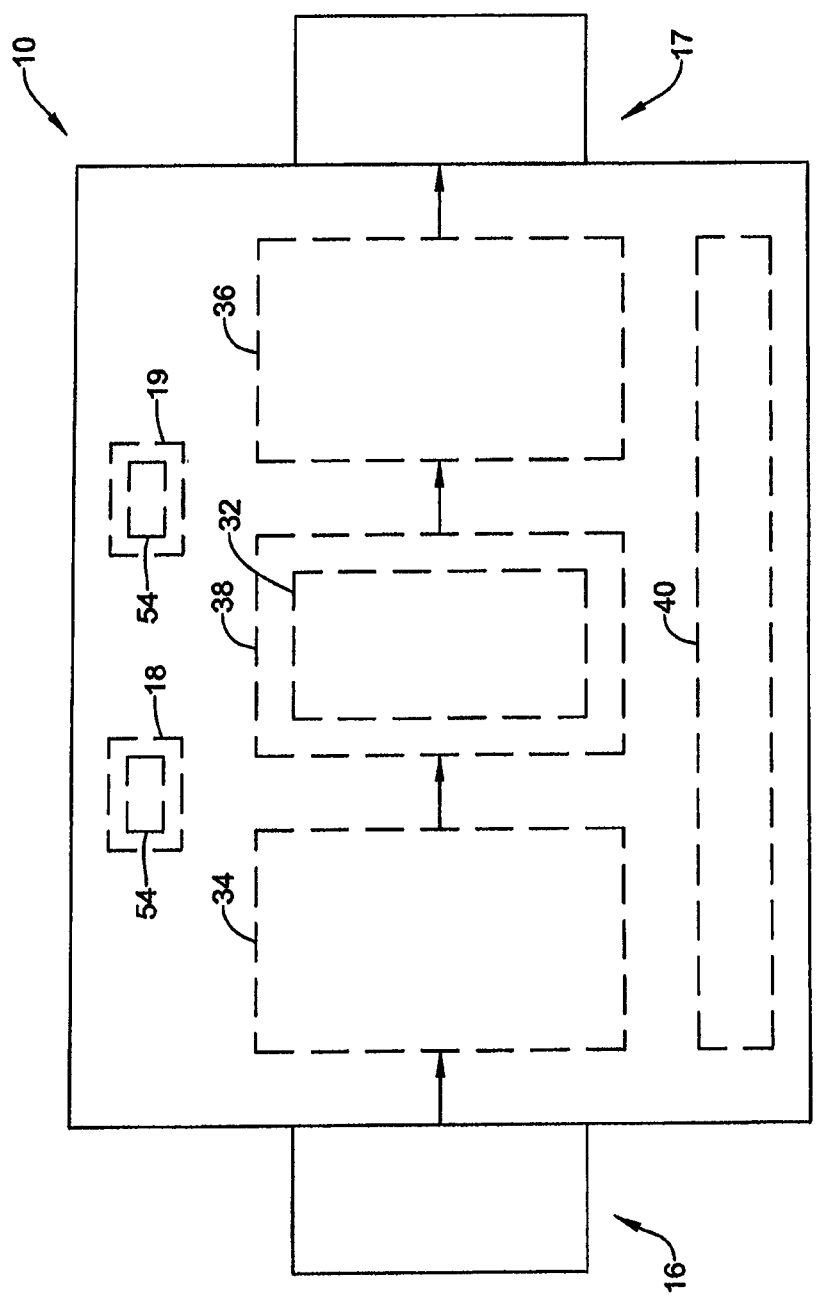
FIG. 2 shows a schematic box diagram of features of an illustrative gas regulating unit according to aspects of the disclosure.

FIG. 1 shows an exploded representation of a gas regulating unit 10 according to the invention, wherein the gas regulating unit 10 of FIG. 1 comprises a valve basic body 11. The gas regulating unit 10 further comprises a safety valve 38 and a main gas valve 32, as shown in FIG. 2.

In the shown illustrative embodiment, the valve basic body 11 of the gas regulating unit 10 according to the invention comprises three parts, namely a plastic core 12, a first metallic shell 13 and a second metallic shell 14. The plastic core 12 defines a gas inlet chamber 34 and a gas outlet chamber 36 of the gas regulating unit, wherein on the gas inlet chamber 34 there is configured a connecting socket 16 for a gas supply line and on the gas outlet chamber 36 there is configured a connecting socket 17 for a gas evacuation line.

The first metallic shell 13 encloses the plastic core 12, at least in sections, on a top side of the same.

The second metallic shell 14 encloses the plastic core 12, likewise at least in sections, on a bottom side of the same.

Between the plastic core 12 and the lower metallic shell 14 there is positioned a diaphragm 15, which at least for the main gas valve delimits a drive chamber 40, in which a servo pressure prevails. The diaphragm 15, which is positioned between the bottom side of the plastic core 12 and the second metallic shell 15 by which the plastic core 12 is enclosed on the bottom side and the second metallic shell 14 jointly delimit at least one drive chamber 40, in which a servo pressure respective prevails.

The metallic shells 13, 14, which enclose the plastic core 12 at least in sections, have connecting elements 20 for the actuators or operators 18, 19 of the safety valve 38 and main gas valve 32, wherein the operators 18, 19 preferably take the form of magnets 54. In addition, a connecting element for the connection of a pressure regulator, by which a servo pressure can be adjusted.

The metallic shells 13, 14 surround the connecting sockets 16, 17 of the plastic core 12. Fastening elements, by which the gas supply line can be fastened to the connecting socket 16 and the gas evacuation line can be fastened to the connecting socket 17, consequently engage on those sections of the metallic shells 13, 14 which enclose the connecting sockets 16, 17.

The plastic cover 12 serves in particular to provide a gas inlet chamber 34 and a gas outlet chamber 36 of the gas regulating unit. The metallic shells 13, 14, which enclose the plastic core 12 at least in section, stabilize the plastic core 12 and protect the same from mechanical loads which can act on the plastic core 12 from the outside. Fastening devices, by which the gas supply line and the gas evacuation line can be fastened to the connecting sockets 16, 17, thus engage on those sections of the metallic shells 13, 14 which enclose the connecting sockets 16, 17. The operators 18, 19, too, are fastened to the connecting elements 20 of the metallic shells 13, 14 or engage on the same. Mechanical forces are consequently absorbed by the metallic shells 13, 14, so that the plastic core 12 is essentially exposed only to loads induced by the gas flow.

The metallic shells 13, 14 which enclose the plastic core 12 on the top side and the bottom side additionally have connecting elements 21, at which the two metallic shells 13, 14 can be connected to each other.

REFERENCE SYMBOL LIST 10 gas regulating unit
11 valve basic body
12 plastic core
13 first metallic shell
14 second metallic shell
15 diaphragm
16 connecting socket
17 connecting socket
18 operator
19 operator
20 connecting element
21 connecting element

The invention claimed is:

1. A gas regulating unit having a valve basic body forming at least a gas inlet chamber and a gas outlet chamber, having a safety valve and having a main gas valve, wherein the safety valve and the main gas valve either allow or shut off a gas flow from the gas inlet chamber into the gas outlet chamber, the valve basic body comprises at least three parts, including at least one single part plastic core, which defines at least part of the gas inlet chamber and the gas outlet chamber, and at least two metallic shells, wherein a first metallic shell encloses the plastic core, at least in sections, on a top side and wherein a second metallic shell encloses the plastic core, at least in sections, on a bottom side, wherein the first metallic shell and second metallic shell are in contact with the plastic shell, and wherein between one of these metallic shells and the plastic core there is positioned at least one diaphragm, which for the safety valve and/or the main gas valve respectively, delimits a drive chamber, in which a servo pressure prevails;

wherein the plastic core defines, in the region of the gas inlet chamber, a connecting socket that protrudes from an outer side wall of a main body of the plastic core, with the extent of the connecting socket defined by an outer socket wall that extends around a perimeter of the connecting socket, the outer socket wall facing one or more of the first metallic shell and the second metallic shell enclosing the plastic core;

wherein the first metallic shell and the second metallic shell include connecting socket portions that collectively extend around the perimeter of the outer socket wall of the connecting socket to provide support to the connecting socket;

wherein the connecting socket portion of the first metallic shell at least partially defines a connecting element that engages a corresponding connecting element of the connecting socket portion of the second metallic shell at a position; and wherein the connecting socket protrudes from the outer side wall of the main body of the plastic core sufficiently far to extend past the connecting elements of the first metallic shell and the second metallic shell.

2. A gas regulating unit according to claim 1, wherein the diaphragm is positioned between the bottom side of the plastic core and the second metallic shell by which the plastic core is enclosed on the bottom side, wherein the drive chamber, which a servo pressure prevails, is delimited on the one hand by the diaphragm and on the other hand by the second metallic shell.

3. A gas regulating unit according to claim 1, wherein the first metallic shell and/or the second metallic shell has one or more connecting elements for actuators and/or operators for actuating the safety valve and/or the main gas valve, and/or for a pressure regulator serving to adjust the servo pressure.

4. A gas valve, comprising:
a single piece plastic core, the plastic core defining a gas inlet socket that protrudes from a first side wall of a main body of the plastic core and the extent of the gas inlet socket is defined by an outer socket wall that extends around a perimeter of the gas inlet socket, and a gas outlet socket that protrudes from a second opposite side wall of the main body of the plastic core and the extent of the gas outlet socket is defined by an outer socket wall that extends around a perimeter of the gas outlet socket, the main body of the plastic core defining at least part of a gas inlet chamber and a gas outlet chamber, with the gas inlet chamber in fluid communication with the gas inlet socket and the gas outlet chamber in fluid communication with the gas outlet socket;
a first single piece metallic shell situated along a first side of the plastic core;
a second single piece metallic shell situated along a second side of the plastic core; wherein the first single piece metallic shell and the second single piece metallic shell are in contact with the plastic core, and wherein the first single piece metallic shell is connected to the second single piece metallic shell about the plastic core such that the first single piece metallic shell and the second single piece metallic shell help protect and isolate the plastic core from outside mechanical forces; and
a diaphragm situated between the first metallic shell and the second metallic shell, the diaphragm forms part of a main gas valve that is configured to modulate a gas flow from the gas inlet chamber to the gas outlet chamber and/or forms part of a safety valve that is configured to allow or shut off a gas flow from the gas inlet chamber to the gas outlet chamber;
wherein the first single piece metallic shell has a gas inlet socket portion and the second single piece metallic shell has a gas inlet socket portion, wherein the gas inlet socket portion of the first single piece metallic shell and the gas inlet socket portion of the second single piece metallic shell collectively protect and provide support to the gas inlet socket of the plastic core;
wherein the first single piece metallic shell has a gas outlet socket portion and the second single piece metallic shell has a gas outlet socket portion, wherein the gas outlet socket portion of the first single piece metallic shell and the gas outlet socket portion of the second single piece metallic shell collectively protect and provide support to the gas outlet socket of the plastic core;
wherein the gas inlet socket portion of the first single piece metallic shell and the gas inlet socket portion of the second single piece metallic shell both extend along at least a majority of the length of the gas inlet socket;
wherein the gas outlet socket portion of the first single piece metallic shell and the gas outlet socket portion of the second single piece metallic shell both extend along at least a majority of the length of the gas outlet socket; and
wherein the gas inlet socket portion of the first single piece metallic shell and the gas inlet socket portion of the second single piece metallic shell collectively extend around or substantially around the perimeter of the outer socket wall of the gas inlet socket of the plastic core to form a gas inlet shell that is configured to fasten to a gas supply line for connecting the gas supply line to the gas valve while reducing stress at the gas inlet socket of the plastic core applied by the gas supply line, and the gas outlet socket portion of the first single piece metallic shell and the gas outlet socket portion of the second single piece metallic shell collectively extend around or substantially around the perimeter of the outer socket wall of the gas outlet socket of the plastic core to form a gas outlet shell that is configured to fasten to a gas evacuation line for connecting the gas evacuation line to the gas valve while reducing stress at the gas outlet socket of the plastic core applied by the gas evacuation line.

5. The gas valve of claim 4, wherein the diaphragm is situated between the plastic core and the second metallic shell, with a drive chamber defined between the diaphragm and the second metallic shell in which a servo pressure prevails.

6. The gas valve of claim 4, wherein the first single piece metallic shell and the second single piece metallic shell collectively substantially cover an outside of the plastic core.

7. The gas valve of claim 4, wherein the first single piece metallic shell and/or the second single piece metallic shell have one or more connecting elements for connecting one or more actuators and/or operators for actuating the safety valve and/or the main gas valve, and/or for a pressure regulator serving to adjust a servo pressure.

8. A gas valve, comprising:
a plastic core, the plastic core defining a gas inlet socket that protrudes from a first side wall of a main body of the plastic core and the extent of the gas inlet socket is defined by an outer wall extending around a perimeter of the gas inlet socket, and a gas outlet socket that extends away from a second opposite side wall of the main body of the plastic core and the extent of the gas outlet socket is defined by an outer wall extending around a perimeter of the gas outlet socket, the main body of the plastic core defining at least part of a gas inlet chamber and a gas outlet chamber, with the gas inlet chamber in fluid communication with the gas inlet socket and the gas outlet chamber in fluid communication with the gas outlet socket;
a first metallic shell situated along a first side of the plastic core, the first metallic shell having a longitudinally extending gas inlet socket portion and a longitudinally extending gas outlet socket portion;
a second metallic shell situated along a second side of the plastic core, the second metallic shell having a longitudinally extending gas inlet socket portion and a longitudinally extending gas outlet socket portion; wherein the first metallic shell and the second metallic shell are in contact with the plastic core; wherein the longitudinally extending gas inlet socket portion of the first metallic shell is connected to the longitudinally extending gas inlet socket portion of the second metallic shell about the gas inlet socket of the plastic core such that the gas inlet socket portion of the first metallic shell and the gas inlet socket portion of the second metallic shell help protect and isolate the gas inlet socket of the plastic core from outside mechanical forces; and
wherein the longitudinally extending gas outlet socket portion of the first metallic shell is connected to the longitudinally extending gas outlet socket portion of the second metallic shell about the gas outlet socket of the plastic core such that the gas outlet socket portion of the first metallic shell and the gas outlet socket portion of the second metallic shell help protect and isolate the gas outlet socket of the plastic core from outside mechanical forces.

9. The gas valve of claim 8, further comprising a diaphragm situated between the plastic core and the second metallic shell.

10. The gas valve of claim 9, further comprising a drive chamber defined between the diaphragm and the second metallic shell.

11. The gas valve of claim 8, further comprising:
a main gas valve that modulates a gas flow from the gas inlet chamber to the gas outlet chamber.

12. The gas valve of claim 11, further comprising:
a safety valve that allows or shuts off a gas flow from the gas inlet chamber to the gas outlet chamber.

13. The gas valve of claim 8, further comprising:
a first fastening element for fastening the gas supply line to the gas valve, wherein the first fastening element engages the longitudinally extending gas inlet socket portions; and
a second fastening element for fastening the gas evacuation line to the gas valve, wherein the second fastening element engages the longitudinally extending gas inlet socket portions of the first metallic shell and the second metallic shell.

14. The gas valve of claim 8, wherein the first metallic shell and the second metallic shell collectively substantially cover the outside of the plastic core.

15. The gas valve of claim 8, wherein the first metallic shell and/or the second metallic shell have one or more connecting elements for connecting one or more actuators and/or operators and/or for a pressure regulator serving to adjust a servo pressure.

16. The gas valve of claim 15, wherein the one or more actuators and/or operators include one or more magnets.

* * * * *